(12) United States Patent
Tada et al.

(10) Patent No.: US 10,726,408 B2
(45) Date of Patent: Jul. 28, 2020

(54) INFORMATION PROCESSING APPARATUS, INFORMATION PROCESSING METHOD, AND INFORMATION PROCESSING SYSTEM

(71) Applicant: FELICA NETWORKS, INC., Tokyo (JP)

(72) Inventors: Jun Tada, Tokyo (JP); Naotaka Takeshita, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 263 days.

(21) Appl. No.: 15/560,441

(22) PCT Filed: Feb. 25, 2016

(86) PCT No.: PCT/JP2016/055715
§ 371 (c)(1),
(2) Date: Sep. 21, 2017

(87) PCT Pub. No.: WO2016/158121
PCT Pub. Date: Oct. 6, 2016

(65) Prior Publication Data
US 2018/0075429 A1    Mar. 15, 2018

(30) Foreign Application Priority Data
Mar. 30, 2015 (JP) .................. 2015-068707

(51) Int. Cl.
*G06Q 20/00* (2012.01)
*G06Q 20/20* (2012.01)
(Continued)

(52) U.S. Cl.
CPC ............. *G06Q 20/209* (2013.01); *G06K 7/10* (2013.01); *G06K 7/14* (2013.01); *G06K 9/00463* (2013.01);
(Continued)

(58) Field of Classification Search
CPC .................................................. G06Q 20/209
(Continued)

(56) References Cited

U.S. PATENT DOCUMENTS

| | | | | |
|---|---|---|---|---|
| 2003/0213844 A1* | 11/2003 | Yoshida | ................. | G06Q 30/06 235/383 |
| 2007/0283175 A1* | 12/2007 | Marinkovic | .......... | G06F 1/3218 713/320 |
| 2012/0187185 A1* | 7/2012 | Sayan | ................ | G06Q 30/0601 235/375 |

FOREIGN PATENT DOCUMENTS

| | | |
|---|---|---|
| JP | 2005-261645 A | 9/2005 |
| JP | 2010-134492 A | 6/2010 |

(Continued)

OTHER PUBLICATIONS

International Search Report and Written Opinion of PCT Application No. PCT/JP2016/055715, dated May 10, 2016, 10 pages of ISRWO.

*Primary Examiner* — Rokib Masud
(74) *Attorney, Agent, or Firm* — Chip Law Group

(57) ABSTRACT

Provided is an information processing apparatus including an estimating unit to estimate a purchased article indicated by receipt information on the basis of the receipt information indicating a result of reading characters from a first captured image which is obtained by capturing an image of a receipt, and code information indicating a result of detecting a one-dimensional code or a two-dimensional code from a second captured image which is obtained by capturing an image of a one-dimensional code or a two-dimensional code of an article.

20 Claims, 7 Drawing Sheets

(51) Int. Cl.
    *G06K 7/10*     (2006.01)
    *G06K 7/14*     (2006.01)
    *G06Q 20/04*    (2012.01)
    *G06K 9/18*     (2006.01)
    *G06K 9/00*     (2006.01)
    *G06Q 20/10*    (2012.01)
    *G06Q 20/32*    (2012.01)

(52) U.S. Cl.
    CPC ......... *G06K 9/183* (2013.01); *G06Q 20/0453* (2013.01); *G06Q 20/102* (2013.01); *G06Q 20/3276* (2013.01); *G06K 2209/01* (2013.01)

(58) Field of Classification Search
    USPC ..................................................... 705/16, 24
    See application file for complete search history.

(56) References Cited

FOREIGN PATENT DOCUMENTS

| | | |
|---|---|---|
| JP | 2012-018493 A | 1/2012 |
| JP | 2013-105363 A | 5/2013 |
| JP | 2014-049058 A | 3/2014 |

\* cited by examiner

FIG. 1

| RETAIL CHAIN NAME | TARGET PERIOD, TARGET DATE | JAN CODE | ARTICLE NAME | MANUFACTURER | CONTAINER | VOLUME | MANUFACTURER RETAIL PRICE | AVERAGE UNIT PRICE (MARKET PRICE) |
|---|---|---|---|---|---|---|---|---|
| | | | | | | | | |

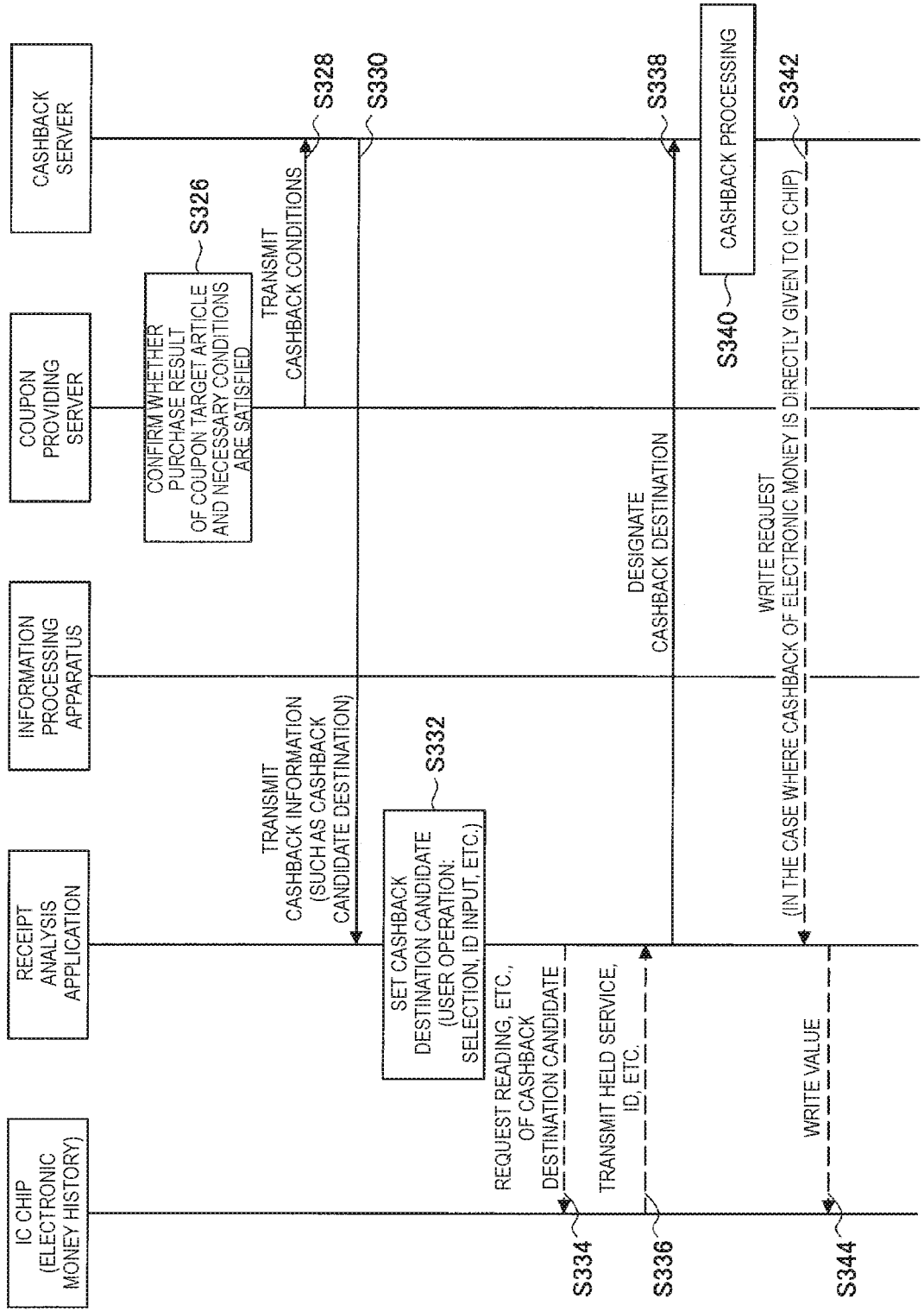

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2016/055715 filed on Feb. 25, 2016, which claims priority benefit of Japanese Patent Application No. JP 2015-068707 filed in the Japan Patent Office on Mar. 30, 2015. Each of the above-referenced applications is hereby incorporated herein by reference in its entirety.

TECHNICAL FIELD

The present disclosure relates to an information processing apparatus, an information processing method, and an information processing system.

BACKGROUND ART

A technology relating to a one-dimensional barcode recognized from a captured image has been developed. As the above-described technology relating to a one-dimensional barcode, for example, there is a technology disclosed in the following Patent Literature 1.

CITATION LIST

Patent Literature

Patent Literature 1: JP 2005-261645A

DISCLOSURE OF INVENTION

Technical Problem

As a method for estimating a purchased article, or the like, from a receipt, for example, there can be a method of checking a character string read by an optical character recognition (OCR), or the like, from a captured image which is obtained by capturing an image of the receipt which is a paper medium, or the like, against a database (or a table, the same will also apply in the following description) in which article name is prescribed.

However, in the case where a method of checking the read character string as described above is used, there is a possibility that checking against the above-described database cannot be correctly performed due to, for example, occurrence of a recognition miss of a character by the OCR, interruption of article name due to limitation of a printed region of the receipt, or setting of article name unique to a retailer (such as, for example, fluctuation of notation, a pseudonym, Chinese characters, a half size of a character, a two-byte character, a description rule and an abbreviation rule).

The present disclosure proposes an information processing apparatus, an information processing method and an information processing system which are new and improved and which can estimate a purchased article on the basis of receipt information indicating a result of reading characters from a captured image which is obtained by capturing an image of a receipt.

Solution to Problem

According to the present disclosure, there is provided an information processing apparatus including: an estimating unit configured to estimate a purchased article indicated by receipt information on the basis of the receipt information indicating a result of reading characters from a first captured image which is obtained by capturing an image of a receipt, and code information indicating a result of detecting a one-dimensional code or a two-dimensional code from a second captured image which is obtained by capturing an image of a one-dimensional code or a two-dimensional code of an article.

Further, according to the present disclosure, there is provided an information processing method executed by an information processing apparatus, the information processing method including: a step of estimating a purchased article indicated by receipt information on the basis of the receipt information indicating a result of reading characters from a first captured image which is obtained by capturing an image of a receipt, and code information indicating a result of detecting a one-dimensional code or a two-dimensional code from a second captured image which is obtained by capturing an image of a one-dimensional code or a two-dimensional code of an article.

Further, according to the present disclosure, there is provided an information processing system comprising a plurality of apparatuses, and estimating a purchased article indicated by receipt information on the basis of the receipt information indicating a result of reading characters from a first captured image which is obtained by capturing an image of a receipt, and code information indicating a result of detecting a one-dimensional code or a two-dimensional code from a second captured image which is obtained by capturing an image of a one-dimensional code or a two-dimensional code of an article.

Advantageous Effects of Invention

According to the present disclosure, it is possible to estimate a purchased article on the basis of receipt information indicating a result of reading characters from a captured image which is obtained by capturing an image of a receipt.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for explaining processing relating to an information processing method according to the present embodiment.

FIG. 4B is an explanatory diagram illustrating the third example of the processing relating to the information processing method according to the present embodiment.

MODE FOR CARRYING OUT THE INVENTION

Figure 2:
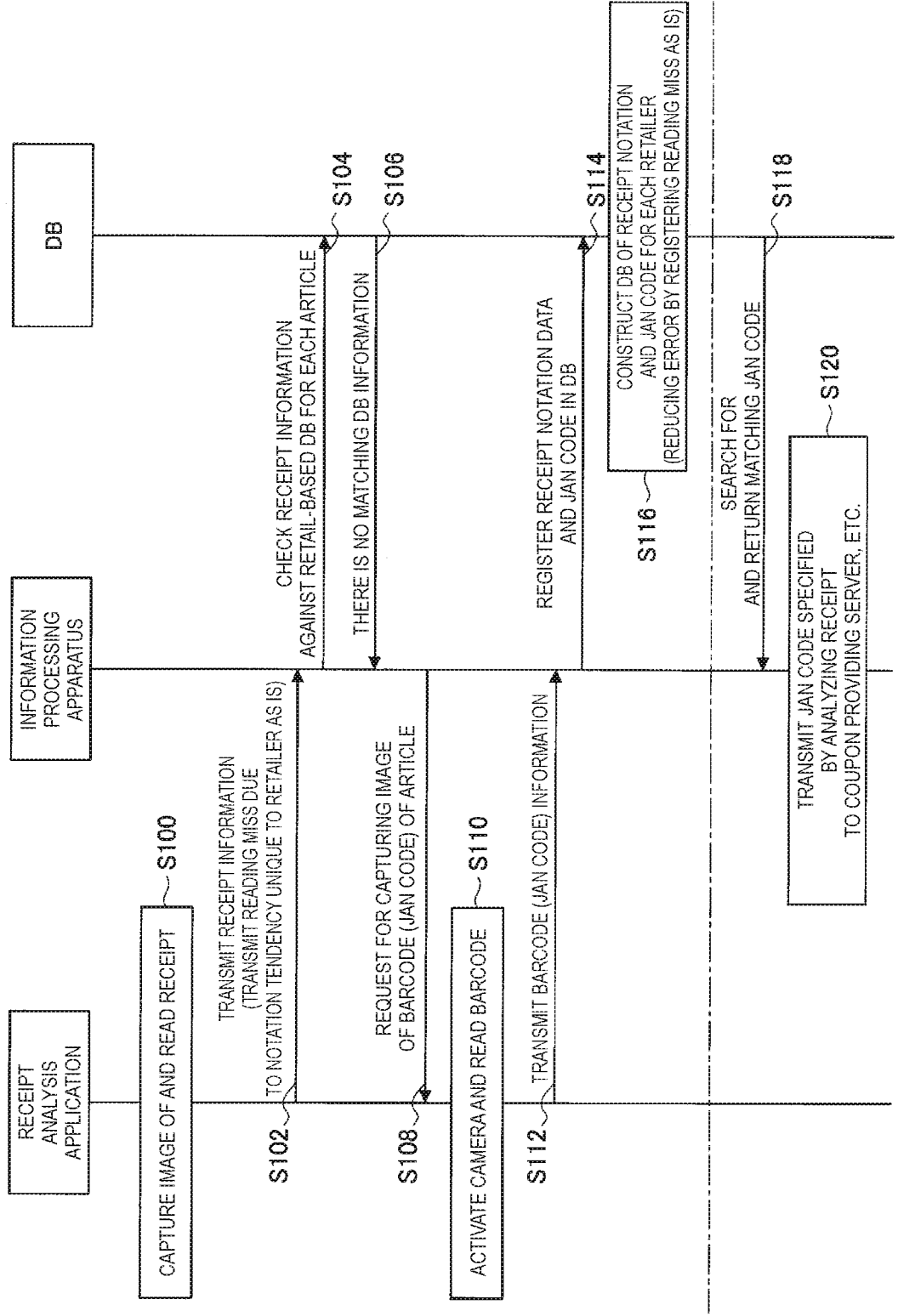
FIG. 2 is an explanatory diagram illustrating a first example of the processing relating to the information processing method according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will be provided below in the following order.
1. Information Processing Method According to Present Embodiment
2. Information Processing Apparatus According to Present Embodiment
3. Program According to Present Embodiment
(Information Processing Method According to Present Embodiment)

An information processing method according to the present embodiment will be described first. In the following description, the information processing method according to the present embodiment will be described using an example where an information processing apparatus according to the present embodiment performs processing relating to the information processing method according to the present embodiment.

[1] Processing Relating to Information Processing Method According to Present Embodiment As described above, in the case where a "method of checking a character string read from a captured image which is obtained by capturing an image of a receipt against a database in which article name is prescribed, is used, there is a possibility that checking against the above-described database cannot be correctly performed due to, for example, occurrence of a recognition miss of a character by an OCR, interruption of article name due to limitation of a printed region of a receipt, or setting of article name unique to a retailer.

Therefore, the information processing apparatus according to the present embodiment estimates a purchased article indicated by receipt information on the basis of the receipt information and code information (estimation processing).

Here, the receipt information according to the present embodiment is data indicating a result of reading characters from a captured image which is obtained by capturing an image of a receipt which is a paper medium, or the like. Examples of the receipt information according to the present embodiment can include, for example, text data indicating read characters (including numbers and symbols. The same will also apply in the following description).

In the following description, there is a case where a captured image which is obtained by capturing an image of a receipt will be referred to as a "first captured image".

In the case where the first captured image is acquired, the information processing apparatus according to the present embodiment reads characters from the acquired first captured image by utilizing an arbitrary technology which is capable of detecting characters from an image, such as an OCR, and generates receipt information. The information processing apparatus according to the present embodiment then uses the generated receipt information in the estimation processing according to the present embodiment.

Further, in the case where the receipt information is acquired, the information processing apparatus according to the present embodiment uses the acquired receipt information in the estimation processing according to the present embodiment.

The first captured image or the receipt information is acquired from an external apparatus through wireless communication or wired communication via a network (or directly). The information processing apparatus according to the present embodiment communicates with the external apparatus via a communication unit (which will be described later) provided at the information processing apparatus or via a connected external communication device.

Examples of the network according to the present embodiment can include, for example, a wired network such as a local area network (LAN), a wide area network (WAN), a wireless network such as a wireless local area network (WLAN), and the Internet using communication protocol such as transmission control protocol/Internet Protocol (TCP/IP).

Further, the code information according to the present embodiment is data indicating a result of detecting a one-dimensional code or a two-dimensional code from a captured image which is obtained by capturing the one-dimensional code or the two-dimensional code of an article. Examples of the code information according to the present embodiment can include, for example, data indicating a code relating to an article, indicated by a one-dimensional code such as a barcode or a two-dimensional code such as a CP code. Examples of the code relating to the article according to the present embodiment can include, for example, a Japanese article number (JAN) code and a European article number (EAN) code. In the following description, there is a case where data indicating a result of detecting a one-dimensional code or a two-dimensional code indicated by the code information according to the present embodiment will be referred to as "code indicated by the code information".

In the following description, there is a case where the captured image which is obtained by capturing an image of a one-dimensional code or a two-dimensional code of an article will be referred to as a "second captured image".

Here, the second captured image according to the present embodiment may be, for example, a captured image including one one-dimensional code or two-dimensional code (that is, a captured image which is obtained by capturing an image of a one-dimensional code or a two-dimensional code for each article), or may be a captured image including a plurality of one-dimensional codes or two-dimensional codes (that is, a captured image which is obtained by capturing an image of one-dimensional codes or two-dimensional codes of a plurality of articles at a time).

In the case where the second captured image is acquired, the information processing apparatus according to the present embodiment generates code information through arbitrary image processing which is capable of detecting a one-dimensional code or a two-dimensional code from the acquired second captured image. The information processing apparatus according to the present embodiment then uses the generated code information in the estimation processing according to the present embodiment.

Further, in the case where the code information is acquired, the information processing apparatus according to the present embodiment uses the acquired code information in the estimation processing according to the present embodiment.

The second captured image or the code information is, for example, acquired from an external apparatus through wireless communication or wired communication via a network (or directly). The information processing apparatus according to the present embodiment communicates with the external apparatus via a communication unit (which will be described later) provided at the information processing apparatus or via a connected external communication device.

Here, the information processing apparatus according to the present embodiment, for example, uses the first captured image or the receipt information, and the second captured image or the code information, acquired in the same transaction, in the estimation processing. Further, the information processing apparatus according to the present embodiment may, for example, use the first captured image or the receipt information and the second captured image or the code information, acquired from the same external apparatus within a set predetermined period, in the estimation processing.

The information processing apparatus according to the present embodiment estimates the purchased article indicated by the receipt information on the basis of the receipt information and the code information as described above. The information processing apparatus according to the present embodiment, for example, estimates the purchased article indicated by the receipt information by specifying a code such as a JAN code and a EAN code, with which an article can be specified, corresponding to the purchased article indicated by the receipt information or by specifying article name, a store where the article is purchased, purchase price, or the like, corresponding to the purchased article indicated by the receipt information.

Specifically, the information processing apparatus according to the present embodiment, for example, checks a character string indicated by the receipt information against a character string corresponding to an article specified from a code indicated by the code information (a detection result of a one-dimensional code or a two-dimensional code indicated by the code information).

Here, because the code information indicates a code relating to an article, such as the JAN code and the EAN code, for example, it is possible to uniquely specify a character string corresponding to an article which matches the code indicated by the code information by using a database in which codes such as the JAN code are associated with character strings corresponding to articles (such as, for example, a character string indicating article name). Processing relating to specification of the character string corresponding to the article which matches the code indicated by the code information may be performed by the information processing apparatus according to the present embodiment or may be performed at an external apparatus of the information processing apparatus according to the present embodiment, such as a server.

The information processing apparatus according to the present embodiment, for example, checks the character string indicated by the receipt information against the character string corresponding to the article specified from the code indicated by the code information specified as described above through prefix match or partial match. Further, the information processing apparatus according to the present embodiment may perform checking using other checking methods such as, for example, perfect match.

In the case where the character string indicated by the receipt information matches the character string corresponding to the article specified from the code indicated by the code information, the information processing apparatus according to the present embodiment estimates that the article specified from the code indicated by the code information is the purchased article indicated by the receipt information.

The information processing apparatus according to the present embodiment estimates the purchased article indicated by the receipt information on the basis of the receipt information and the code information, for example, as described above, as the estimation processing.

Here, the information processing apparatus according to the present embodiment estimates the purchased article indicated by the receipt information by checking the character string indicated by the receipt information against the character string corresponding to the article specified from the code indicated by the code information.

Further, as described above, because the code information indicates a code, such as the JAN code and the EAN code, relating to the article, for example, it is possible to uniquely specify the character string corresponding to the article which matches the code indicated by the code information by using a database in which codes such as the JAN code are associated with character strings corresponding to articles.

Therefore, the information processing apparatus according to the present embodiment can estimate the purchased article on the basis of the receipt information indicating a result of reading characters from a captured image which is obtained by capturing an image of the receipt.

Note that the estimation processing according to the present embodiment is not limited to the above-described examples.

The information processing apparatus according to the present embodiment can also perform, for example, processing as described in the following (a) to (d) as the estimation processing.

(a) First Example of Estimation Processing

For example, in the case where the purchased article is estimated, the information processing apparatus according to the present embodiment records the character string indicated by the receipt information for which the article is estimated and the code information in association with each other. The information processing apparatus according to the present embodiment, for example, records the character string indicated by the receipt information and the code information in association with each other in a storage unit (which will be described later) provided at the information processing apparatus according to the present embodiment, an external recording medium connected to the information processing apparatus according to the present embodiment, a recording medium provided at an external apparatus such as a server, or the like.

The information processing apparatus according to the present embodiment, for example, records the character string indicated by the receipt information and the code information in association with each other by generating or updating data in an arbitrary format, such as a table format and a database format, with which the character string indicated by the receipt information and the code information can be recorded in association with each other. In the following description, data in which the character string indicated by the receipt information and the code information are stored in association with each other will be referred to as "reference information".

Here, in the character string indicated by the receipt information based on the first captured image, the same article can be expressed with a plurality of character strings due to, for example, occurrence of a recognition miss of characters by the OCR, interruption of article name due to limitation of a printed region of the receipt, setting of article name unique to a retailer, or the like.

In the case where the purchased article is estimated, the information processing apparatus according to the present embodiment can learn, for example, a pattern of a recognition miss by the OCR, a pattern of notation by limitation of a printed region of the receipt, and a pattern of setting of article name unique to a retailer by recording the character string indicated by the receipt information and the code information in association with each other in the reference information, or the like.

Further, as described above, in the case where the character string indicated by the receipt information and the code information are recorded in association with each other, the information processing apparatus according to the present embodiment, for example, estimates the purchased article indicated by the receipt information using the reference information stored in a recording medium, that is, by utilizing a learning result. In other words, for example, the information processing apparatus according to the present embodiment further performs estimation of an article based on the character string indicated by the receipt information and the reference information, in addition to estimation of an article based on the character string indicated by the receipt information and the character string corresponding to the article specified from the code indicated by the code information as described above.

In the case where an article is estimated on the basis of the reference information, the information processing apparatus according to the present embodiment, for example, extracts the code information associated with the character string indicated by the receipt information from the reference information. The information processing apparatus according to the present embodiment then, for example, estimates the purchased article indicated by the receipt information on the basis of the code information extracted from the reference information. The information processing apparatus according to the present embodiment, for example, sets the code information extracted from the reference information or article name, or the like, specified on the basis of the code information as an estimation result of the article. Further, the information processing apparatus according to the present embodiment may, for example, estimate an article by checking the character string indicated by the receipt information against a character string corresponding to the article specified from the code indicated by the code information extracted from the reference information.

In the case where processing is performed by utilizing the reference information as the estimation processing, the information processing apparatus according to the present embodiment, for example, first, estimates an article on the basis of the reference information. Further, in the case where an article is not estimated on the basis of the reference information, the information processing apparatus according to the present embodiment estimates an article on the basis of the character string indicated by the receipt information and the character string corresponding to the article specified from the code indicated by the code information.

Note that the estimation processing in the case where processing is performed by utilizing the reference information is not limited to the above-described processing. For example, the information processing apparatus according to the present embodiment may perform "estimation of an article based on the reference information" and "estimation of an article based on the character string indicated by the receipt information and the character string corresponding to the article specified from the code indicated by the code information" in parallel. In the case where the "estimation of an article based on the reference information" and the "estimation of an article based on the character string indicated by the receipt information and the character string corresponding to the article specified from the code indicated by the code information" are performed in parallel, the information processing apparatus according to the present embodiment, for example, estimates an article using a result of at least one of a result of the "estimation of an article based on the reference information" and a result of the "estimation of an article based on the character string indicated by the receipt information and the character string corresponding to the article specified from the code indicated by the code information".

As described above, when processing is performed by utilizing the reference information as the estimation processing, also in the case where the second captured image or the code information is not acquired, it is possible to estimate an article on the basis of the receipt information by utilizing the learning result (reference information).

(b) Second Example of Estimation Processing

In the case where the character string indicated by the receipt information is checked against the character string corresponding to the article specified from the code indicated by the code information, as a result of checking, there is a case where a plurality of character strings corresponding to the article specified from the code indicated by the code information match the character string indicated by the receipt information. Here, a plurality of character strings which match the character string indicated by the receipt information, and which correspond to the article specified from the code indicated by the code information, correspond to candidates of the character string indicating an article to be estimated.

As described above, in the case where a plurality of character strings corresponding to the article specified from the code indicated by the code information match the character string indicated by the receipt information, the information processing apparatus according to the present embodiment, for example, extracts a number indicating price corresponding to the character string indicated by the receipt information from the receipt information.

Further, the information processing apparatus according to the present embodiment, for example, acquires information relating to sale corresponding to the article specified from the code indicated by the code information.

Here, examples of the information relating to sale according to the present embodiment can include, for example, a database (or a table) in which information indicating an article (such as, for example, article name and a code such as the JAN code) is associated with information indicating price such as list price and market price of the article. Further, information indicating a retailer (such as, for example, retailer chain name) or additional information relating to an article, such as a manufacturer may be associated with the information relating to sale according to the present embodiment.

FIG. 1 is an explanatory diagram for explaining processing relating to the information processing method according to the present embodiment, and illustrates an example of the information relating to sale according to the present embodiment. FIG. 1 illustrates an example of the database in which the information relating to sale is recorded in association with information indicating an article, information indicating price, or the like (an example of so-called article master data or point of sales (POS) master data).

Note that the information relating to sale according to the present embodiment is not limited to the example illustrated in FIG. 1. For example, the information relating to sale according to the present embodiment may be data indicating content of a flyer of a retailer.

The information processing apparatus according to the present embodiment, for example, acquires data indicating price corresponding to the code indicated by the code information (for example, data indicating "manufacturer retail price" and "average unit price" illustrated in FIG. 1) from the information relating to sale such as the database as illustrated in FIG. 1. The information processing apparatus according to the present embodiment, for example, acquires data indicating the price corresponding to the code indicated by the code information by communicating with an external apparatus such as a server managed by a retailer, which stores the information relating to sale.

Further, the information processing apparatus according to the present embodiment specifies data indicating price with the smallest difference with a number indicating the price extracted from the receipt information, from the acquired data indicating the price. The information processing apparatus according to the present embodiment then estimates the purchased article indicated by the receipt information assuming that the character string corresponding to the article specified from the code indicated by the code information, corresponding to the specified data indicating the price is the character string which matches the character string indicated by the receipt information.

For example, by using the information relating to sale as described above, it is possible to further improve accuracy of checking the character string indicated by the receipt information against the character string corresponding to the article specified from the code indicated by the code information. Therefore, for example, by using the information relating to sale as described above, the information processing apparatus according to the present embodiment can further improve accuracy of estimation of an article.

(c) Third Example of Estimation Processing

The information processing apparatus according to the present embodiment can also estimate a retailer who sells the article on the basis of the receipt information and estimate the purchased article on the basis of the information relating to sale corresponding to the estimated retailer.

The information processing apparatus according to the present embodiment estimates a retailer corresponding to the receipt information by searching for set retailer name from the character string indicated by the receipt information.

The information processing apparatus according to the present embodiment then checks the character string indicated by the receipt information with reference to information relating to sale corresponding to the estimated retailer (for example, in the example illustrated in FIG. 1, information relating to sale in which a retailer chain name matches the estimated retailer). In the case where the information relating to sale is a database illustrated in FIG. 1, the information processing apparatus according to the present embodiment estimates the purchased article indicated by the receipt information by checking the character string indicated by the receipt information against the article name illustrated in FIG. 1 through forward match.

Note that, in the case where a plurality of kinds of article name are detected as a result of checking the character string indicated by the receipt information against the article name illustrated in FIG. 1, the information processing apparatus according to the present embodiment performs estimation using price in a similar manner to the processing according to the second example described in the above (b).

The estimation processing according to the third example is, for example, estimation processing especially effective in the case where the receipt information based on the receipt issued at a retailer who makes use of the same notation in the receipt and in the article master data is processed.

(d) Fourth Example of Estimation Processing

The information processing apparatus according to the present embodiment may perform processing in which two or more kinds of processing among the estimation processing according to the first example described in the above (a) to the estimation processing according to the third example described in the above (c) are performed in combination.

The information processing apparatus according to the present embodiment performs, for example, the estimation processing as described above as the processing relating to the information processing method according to the present embodiment.

Note that the processing relating to the information processing method according to the present embodiment is not limited to the above-described estimation processing.

For example, the information processing apparatus according to the present embodiment can perform one or more kinds of processing among (1) confirmation processing, (2) execution processing and (3) electronic settlement processing described below.

(1) Confirmation Processing

As the above-described estimation processing, in the case where processing is performed on the basis of the receipt information, there is a possibility that content of the receipt indicated by the receipt information may include or indicate as follows:

including a character generated by a recognition miss of a character by the OCR including content of a falsified receipt (such as a receipt in which date, an amount, article name, or the like, is rewritten, and a fictitious receipt)

indicating content of receipts of others indicating content of a receipt for which the article has been previously estimated Therefore, the information processing apparatus according to the present embodiment confirms content of the receipt indicated by the receipt information by combining information (data) other than the receipt information.

The content of the receipt confirmed by the information processing apparatus according to the present embodiment can include, for example, one or more among "whether a result of reading characters from the first captured image is correct", "whether a person who purchases an article relating to the receipt corresponding to the receipt information and a person who applies execution of the processing at the information processing apparatus according to the present embodiment are the same person" and "whether the purchased article has already been estimated on the basis of the receipt information".

By confirming "whether a result of reading characters from the first captured image is correct", for example, it is possible to discern the above-described receipt information including a character generated by a recognition miss of a character by the OCR and the receipt information indicating content of the falsified receipt. Further, by confirming "whether a person who purchases an article relating to the receipt corresponding to the receipt information and a person who applies execution of the processing at the information processing apparatus according to the present embodiment are the same person", for example, it is possible to discern the receipt information indicating content of receipts of others. Further, by confirming "whether the purchased article has already been estimated on the basis of the receipt information", for example, it is possible to discern the receipt information indicating content of the receipt for which the article has been previously estimated.

Examples of information other than the receipt information used by the information processing apparatus according to the present embodiment in the confirmation processing can include, for example, information relating to settlement history.

Examples of the information relating to settlement history according to the present embodiment can include, for example, an amount of settlement, date and time, data indicating a settling person, and information depending on a settlement method. Examples of the information depending on the settlement method in the case where settlement is performed using electronic money by utilizing near field communication (NFC) can include, for example, an ID of a reader/writer (interrogator), an electronic money ID and data indicating an electronic money type. Further, Examples of the information depending on the settlement method in the case where settlement is performed using a credit card can include, for example, data indicating credit card number, data indicating transaction number and data indicating a credit card bland type.

The information processing apparatus according to the present embodiment acquires the information relating to settlement history through, for example, communication with an external apparatus (or an external device) as described below. Here, the acquired information relating to settlement history may be, for example, information indicating history of settlement using electronic money performed at the information processing apparatus according to the present embodiment.

a security chip such as an IC chip conforming to NFC, a subscriber identity module (SIM) card, or the like, built into a mobile phone, a smartphone, or the like a server of a retailer, a server of a settlement company, a server of electronic money institution, or the like Note that a method for acquiring the information relating to settlement history according to the present embodiment is not limited to the above-described examples. For example, in the case where the information relating to settlement history is, for example, information indicating history of settlement using electronic money performed at the information processing apparatus according to the present embodiment, the information processing apparatus according to the present embodiment can also record history of settlement using electronic money in a recording medium such as a storage unit (which will be described later) and can acquire information relating to the settlement history from the recording medium.

For example, it is possible to confirm "whether a result of reading characters from the first captured image is correct" by checking the receipt information against the information relating to settlement history as described above.

Further, for example, it is possible to confirm "whether the purchased article has already been estimated on the basis of the receipt information" through history of referring to the information relating to settlement history as described above. The information processing apparatus according to the present embodiment confirms "whether or not the purchased article has already been estimated on the basis of the receipt information", for example, by confirming whether the information relating to the settlement history referred to previously is referred to again. For example, a case where the information relating to the settlement history referred to previously is referred to again corresponds to a case where the purchased article has already been estimated on the basis of the receipt information.

Note that information other than the receipt information used by the information processing apparatus according to the present embodiment in the confirmation processing is not limited to the above-described information relating to settlement history.

The above-described information other than the receipt information may further include identification information indicating a person who applies execution of processing at the information processing apparatus according to the present embodiment and location information indicating a location where settlement is performed.

Examples of the above-described identification information indicating a person who applies execution can include, for example, data indicating registration content for receiving service provided using the information processing method according to the present embodiment (such as, for example, data indicating user name).

The information processing apparatus according to the present embodiment can confirm "whether a person who purchases an article relating to the receipt corresponding to the receipt information and a person who applies execution of processing at the information processing apparatus according to the present embodiment are the same person", for example, by checking the receipt information against the information relating to settlement history as described above and the above-described identification information indicating a person who applies the execution.

Further, examples of the location information indicating a location where settlement is performed can include, for example, location data of a location detection device such as a global positioning system (GPS) device provided at an apparatus which is used to perform settlement at a settlement location such as a retail store.

In the case where the apparatus used in settlement at the above-described settlement location is a portable apparatus such as a mobile phone and a smartphone, the apparatus, for example, records the location information as well as the settlement history as a log when the apparatus detects that settlement is performed. The above-described apparatus such as a mobile phone and a smartphone, for example, monitors the security chip provided at the apparatus and detects that settlement is performed on the basis of a signal from an external apparatus such as a reader/writer.

Further, the information processing apparatus according to the present embodiment acquires location information along with the above-described information relating to settlement history from the above-described apparatus such as a mobile phone and a smartphone.

The information processing apparatus according to the present embodiment then confirms that a person is located near a location where settlement is performed at time when settlement is performed using the receipt information, the information relating to settlement history as described above and the location information. As described above, the information processing apparatus according to the present embodiment can discern fraudulent receipt information such as, for example, receipt information indicating content of a falsified receipt and receipt information indicating content of receipts of others by further using the location information.

(2) Execution Processing

The information processing apparatus according to the present embodiment performs processing in accordance with an estimation result of the purchased article estimated through the above-described estimation processing.

Examples of the processing in accordance with the estimation result of the purchased article according to the present embodiment can include, for example, processing relating to cashback in accordance with the estimated article. Examples of a method for cashback according to the present embodiment can include various methods such as, for example, cashback using electronic money, cashback through deposit into a bank account and cashback through a credit card company.

Note that the processing in accordance with the estimation result of the purchased article according to the present embodiment is not limited to the above-described processing relating to cashback. For example, the processing in accordance with the estimation result of the purchased article according to the present embodiment may be delivery processing of delivering coupon information or recommend information associated with the estimated article. In the following description, an example will be mainly described where the processing in accordance with the estimation result of the purchased article according to the present embodiment is processing relating to cashback in accordance with the estimated article.

Examples of a method of returning an incentive to a purchaser in accordance with purchase of an article can include, for example, a "method of discounting price upon purchase at a retail store". However, in the case where the "method of discounting price upon purchase at a retail store" is performed, because it is necessary to change a store system, and there is a possibility that store staff operation is affected, it is difficult to increase retail stores which handle the method.

Meanwhile, the information processing apparatus according to the present embodiment performs processing relating to cashback in accordance with the estimated article (an example of processing in accordance with the estimation result of the purchased article) on the basis of the estimation result of the purchased article estimated through the above-described estimation processing.

Therefore, in the case where the information processing apparatus according to the present embodiment performs processing relating to cashback in accordance with the estimated article, it is not necessary to change a store system, and store staff operation is not affected as in the case where the above-described "method of discounting price upon purchase at a retail store" is used.

More specifically, the information processing apparatus according to the present embodiment performs the following processing as processing in accordance with the estimation result of the purchased article. Note that, while an example of the processing relating to cashback in accordance with the estimated article will be described below, as described above, the processing in accordance with the estimation result of the purchased article according to the present embodiment is not limited to the processing relating to cashback in accordance with the estimated article.

(2-1) First Example of Execution Processing

The information processing apparatus according to the present embodiment executes cashback after it is guaranteed that a person who applies cashback (an example of a person who applies execution of the processing at the information processing apparatus) and a person who receives cashback are the same person.

The information processing apparatus according to the present embodiment, for example, specifies a user to whom a result of processing in accordance with the estimation result is to be provided on the basis of identification information indicating a person who applies execution of processing at the information processing apparatus according to the present embodiment. Here, examples of the above-described identification information indicating a person who applies the execution can include, for example, data indicating registration content for receiving service to be provided using the information processing method according to the present embodiment (such as, for example, data indicating user name) as described above.

The information processing apparatus according to the present embodiment then, for example, provides a result of the processing in accordance with the estimation result to the specified user. For example, in the case where processing relating to cashback in accordance with the estimated article is performed, cashback is given to the specified user.

Specifically, the information processing apparatus according to the present embodiment, for example, specifies account information for cashback corresponding to the specified user with reference to a table (or a database) in which the above-described identification information indicating a person who applies execution is associated with account information for cashback (such as, for example, data indicating a cashback method and data indicating a cashback destination). The information processing apparatus according to the present embodiment then gives cashback corresponding to an amount corresponding to the purchased article on the basis of the specified account information.

By using a table, or the like, as described above, in which the above-described identification information indicating a person who applies cashback is associated with the account information for cashback, it is possible to guarantee that the person who applies cashback and a person who receives cashback are the same person.

Note that a method for guaranteeing that a person who applies cashback and a person who receives cashback are the same person is not limited to the above-described examples.

For example, the information processing apparatus according to the present embodiment specifies a user to whom a result of processing in accordance with the estimation result is to be provided on the basis of information relating to settlement history corresponding to content of the receipt indicated by the receipt information. Then, the information processing apparatus provides a result of processing in accordance with the estimation result to the specified user.

As an specific example, the information processing apparatus according to the present embodiment, for example, specifies a person associated with an electronic money ID indicated by the information relating to settlement history as a user to whom a result of processing in accordance with the estimation result is to be provided. The information processing apparatus according to the present embodiment then gives cashback of electronic money corresponding to an amount corresponding to the purchased article to the electronic money ID.

As in the above-described specific example, as a result of cashback being given to the electronic money ID indicated by the information relating to settlement history, it is possible to more firmly guarantee that the person who applies cashback and the person who receives the cashback are the same person.

Further, for example, in the case where cashback is applied from application of a smartphone, or the like, the information processing apparatus according to the present embodiment can more firmly guarantee that the person who applies cashback and the person who receives the cashback are the same person by giving cashback of electronic money corresponding to an amount corresponding to the purchased article to a security chip provided at the smartphone.

(2-2) Second Example of Execution Processing

The information processing apparatus according to the present embodiment executes cashback after avoiding a plurality of incentives from being acquired by the same person.

As described in the above (2-1), the information processing apparatus according to the present embodiment, for example, specifies a person who receives cashback using a table (or a database) in which identification information indicating a person who applies execution of the processing at the information processing apparatus according to the present embodiment is associated with account information for cashback.

Here, the information processing apparatus according to the present embodiment, for example, does not allow association of a plurality of pieces of identification information with the account information in the above-described table, or the like. That is, even if the person who applies execution of the processing at the information processing apparatus according to the present embodiment creates a plurality of login ID accounts, in the case where the same account information has already been registered in the above-described table, or the like, the identification information and the account information are not registered in the above-described table, or the like.

As described above, because it is not allowed to associate a plurality of pieces of identification information with account information in the above-described table, or the like, it is possible to avoid a plurality of incentives from being acquired by the same person.

Further, for example, a cashback destination may be limited to a security chip, or the like, provided at an apparatus such as a smartphone in which a plurality of applications relating to the same service cannot be installed in one apparatus. By limiting the cashback destination as described above, it is possible to avoid cashback from being applied from a plurality of applications of the same type installed at one apparatus.

Therefore, also by limiting the cashback destination to a security chip, or the like, provided at an apparatus such as a smartphone in which a plurality of applications relating to the same service cannot be installed in one apparatus, it is possible to avoid a plurality of incentives from being acquired by the same person. Further, as described above, for example, in the case where cashback is applied from application of a smartphone, or the like, by giving cashback of electronic money corresponding to an amount corresponding to the purchased article to a security chip provided at the smartphone, it is possible to firmly guarantee that a person who applies cashback and a person who receives the cashback are the same person.

Further, for example, in the case where cashback is applied from application of a smartphone, or the like, the information processing apparatus according to the present embodiment may acquire an ID of a security chip provided at the smartphone and determine whether cashback has already been given to the apparatus. In the case where it is determined that cashback has already been given to the apparatus, the information processing apparatus according to the present embodiment does not give cashback to the apparatus.

Therefore, by determining whether or not cashback has already been given to the apparatus as described above, for example, it is possible to avoid a plurality of incentives from being acquired by the same person regardless of whether or not it is possible to install a plurality of applications relating to the same service in one apparatus or regardless of whether or not it is possible to apply cashback from a plurality of different applications.

Note that it is possible to inhibit application of cashback from a plurality of different applications, for example, by delivering a software development kit (SDK) for preventing application of cashback from a plurality of different applications to a developer of applications, or the like.

(2-3) Third Example of Execution Processing

The information processing apparatus according to the present embodiment gives cashback in accordance with set setting conditions of cashback.

Here, the setting conditions of cashback according to the present embodiment are set, for example, through operation by a user of the information processing apparatus according to the present embodiment. Further, the setting conditions of cashback according to the present embodiment may be, for example, set on the basis of setting information (data) indicating the setting conditions of cashback acquired from an external apparatus such as a server of a company such as a manufacturer of an article.

Examples of the setting conditions of cashback according to the present embodiment can include, for example, examples described in the following (i) to (iv).

(i) Conditions Linked to Purchased Amount

Cashback corresponding to X [%] of the purchased amount, cashback corresponding to a fixed amount, or the like (ii) Other Conditions Cashback corresponding to N [%] if an article is purchased until date M, cashback corresponding to P [yen] if an article is purchased during the morning, cashback corresponding to Q [yen] if an article is purchased at Tokyo, increase of cashback by Y [%] if an article is purchased with electronic money, or the like (iii) Conditions of Cashback Method Designation of a cashback method for each store, a retailer, or the like (for example, only electronic money, only house money, or the like)

Only electronic money used for purchase

Cashback by performing direct write in electronic money which is stored inside a chip, in which value is stored in a security chip, or the like (for example, corresponding to a card and a mobile)

Cashback to a value managed at a server, or the like (for example, corresponding to electronic money managed by a server, point, or the like)

A person who applies cashback can select a cashback method (iv) Cashback Receiving Conditions Setting of a cashback receiving deadline Setting so that cashback cannot be received until cashback corresponding to a specified amount is accumulated For example, by the setting conditions of cashback as described above being set, for example, it is possible to realize flexible cashback campaign. Note that it goes without saying that the setting conditions of cashback according to the present embodiment are not limited to the examples described in the above (i) to (iv).

(2-4) Fourth Example of Execution Processing

The information processing apparatus according to the present embodiment gives cashback without making a user conscious of cashback work.

For example, in the case where cashback is given to an account which is managed by a server, by a cashback destination being set in advance as the above-described account information, it is possible to give cashback without making the user conscious of cashback work.

Further, for example, in the case where cashback is given to electronic money which is stored inside a chip, in which value is stored in a security chip, or the like, for example, as described below, cashback is automatically given to a security chip, or the like, only by the user daily using electronic money.

For example, an example where cashback is automatically given at the same time as purchase using electronic money can be realized as follows.

An electronic money type or an ID is registered in advance as a cashback destination.

A user acquires cashback right in accordance with a result of application to cashback campaign.

The electronic money type and the ID, and a cashback balance are managed at a server, or the like, and are coordinated with a thin client type reader/writer server.

The user does some shopping at a retail store by utilizing electronic money.

In the case where the thin client type reader/writer is utilized in settlement, settlement processing is performed at the server, or the like, using electronic money.

The server, or the like, confirms whether the card is an electronic money card, or the like, having cashback balance as well as deducts an amount relating to settlement from value of electronic money via the thin client type reader/writer.

In the case where the card is an electronic money card, or the like, having cashback balance, cashback is given via the thin client type reader/writer.

(Note that the above-described deduction processing and processing relating to cashback may be continuously performed, or an amount of difference may be calculated in advance and the processing may be performed at a time.)

For example, by the processing as described above being performed, the user can receive cashback at the same time as shopping without being conscious of cashback operation.

(3) Electronic Settlement Processing

The information processing apparatus according to the present embodiment can also perform settlement using electronic money.

The information processing apparatus according to the present embodiment, for example, subtracts a value amount of electronic money stored in an IC chip, or the like, built in a smartphone, or the like, in accordance with settlement content. The information processing apparatus according to the present embodiment, for example, can also perform settlement using electronic money in coordination with a server, or the like, of electronic money institution.

Further, when settlement is performed, the information processing apparatus according to the present embodiment, for example, records settlement history in a recording medium such as a storage unit (which will be described later). Further, in the case where settlement is performed using electronic money in coordination with a server, or the like, of electronic money institution, settlement history may be stored in an external apparatus such as a server of electronic money institution.

Therefore, in the case where electronic settlement processing is performed at the information processing apparatus according to the present embodiment, information relating to settlement history according to the present embodiment includes information relating to settlement through the electronic settlement processing.

As the processing relating to the information processing method according to the present embodiment, the information processing apparatus according to the present embodiment performs, for example, "the above-described estimation processing", "the above-described estimation processing and the above-described processing of (1) (confirmation processing)", "the above-described estimation processing and the above-described processing of (2) (execution processing)", "the above-described estimation processing, the above described processing of (1) (confirmation processing) and the above-described processing of (2) (execution processing)", "the above-described estimation processing and the above-described processing of (3) (electronic settlement processing)", "the above-described estimation processing, the above-described processing of (1) (estimation processing) and the above-described processing of (3) (electronic settlement processing)", "the above-described estimation processing, the above-described processing of (2) (execution processing) and the above-described processing of (3) (electronic settlement processing)", and "the above-described estimation processing, the above-described processing of (1) (confirmation processing), the above-described processing of (2) (execution processing) and the above-described processing of (3) (electronic settlement processing)".

Note that the processing relating to the information processing method according to the present embodiment is divided into "the above-described estimation processing", "the above-described estimation processing and the above-described processing of (1) (confirmation processing)", "the above-described estimation processing and the above-described processing of (2) (execution processing)", "the above-described estimation processing, the above-described processing of (1) (confirmation processing) and the above-described processing of (2) (execution processing)", or the like, for convenience. Therefore, in the processing relating to the information processing method according to the present embodiment, for example, "the above-described estimation processing" can be regarded as two or more kinds of processing (depending on an arbitrary way of dividing the processing). Further, in the processing relating to the information processing method according to the present embodiment, for example, "the above-described estimation processing and the above-described processing of (1) (confirmation processing)", "the above-described estimation processing and the above-described processing of (2) (execution processing)", "the above-described estimation processing, the above-described processing of (1) (confirmation processing) and the above-described processing of (2) (execution processing)", or the like, can be respectively regarded as one kind of processing, or can be respectively regarded as two or more kinds of processing (depending on an arbitrary way of dividing the processing).

[2] Specific Example of Processing Relating to Information Processing Method According to Present Embodiment A specific example of the above-described processing relating to the information processing method according to the present embodiment will be described next.

[2-1] First Example of Processing Relating to Information Processing Method According to Present Embodiment FIG. 2 is an explanatory diagram illustrating a first example of the processing relating to the information processing method according to the present embodiment and illustrates an example of the processing in the case where the estimation processing according to the present embodiment is performed.

Receipt analysis application executed by a processor, or the like, at an apparatus at a side which applies execution of the processing (hereinafter, simply referred to as an "application side apparatus") at the information processing apparatus according to the present embodiment generates receipt information by reading a first captured image which is obtained by capturing an image of a receipt (S100). The first captured image is, for example, acquired through image capturing operation performed by a user by the receipt analysis application making notification (for example, visual notification or auditory notification) to the user of the application side apparatus.

The receipt analysis application then transmits the receipt information to the information processing apparatus according to the present embodiment (S102).

The information processing apparatus according to the present embodiment checks each of character strings for each article included in the receipt information against a database for each retailer as illustrated in, for example, FIG. 1 (S104). The information processing apparatus according to the present embodiment, for example, issues a query to the database to search for a JAN code corresponding to each of the above-described character strings from the database.

In the case where there exists a record corresponding to the character string in the database as a result of the processing in step S104, the JAN code corresponding to the character string is obtained from the database (S118), and the article included in the receipt information is estimated by the JAN code being obtained from the database at the information processing apparatus according to the present embodiment. Further, at the information processing apparatus according to the present embodiment, the obtained JAN code (example of the estimation result of the purchased article) is transmitted to, for example, an external apparatus such as a coupon providing server which performs processing relating to provision of a coupon (S120).

Further, in the case where a record corresponding to the character string does not exist in the database as a result of the processing in step S104 (S106), the information processing apparatus according to the present embodiment transmits an image capturing request for capturing an image of a barcode (example of a one-dimensional code) of the article corresponding to the receipt information to the receipt analysis application executed at the application side apparatus (S108).

The receipt analysis application which acquires the image capturing request transmitted in step S108 generates barcode information (example of the code information. Hereinafter, the same will also apply) by activating an image capturing device provided at the application side apparatus (or an external image capturing device connected to the application side apparatus) and reading a second captured image which is obtained by capturing an image of the barcode (S110). The second captured image is, for example, acquired through image capturing operation performed by a user by notification (for example, visual notification or auditory notification) being made to the user of the application side apparatus in response to the image capturing request.

The receipt analysis application then transmits the barcode information to the information processing apparatus according to the present embodiment (S112).

The information processing apparatus according to the present embodiment which acquires the barcode information transmitted in step S112, for example, registers a character string of the receipt information whose record does not exist in the database and the JAN code indicating the acquired barcode information in the database in association with each other (S114). By the processing from step S106 to step S114 being repeated, a database which can implement a learning function is constructed (S116).

The information processing apparatus according to the present embodiment, for example, estimates an article included in the receipt information using the JAN code indicated by the barcode information acquired in response to the image capturing request as a JAN code which corresponds to the charter string of the receipt information whose record does not exist in the database. The information processing apparatus according to the present embodiment then performs similar processing to processing in step S120.

Note that, as described above, the information processing apparatus according to the present embodiment may estimate an article included in the receipt information, for example, by checking the character string of the receipt information against the character string specified from the JAN code indicated by the barcode information acquired in response to the image capturing request. In the case where an article included in the receipt information is estimated through checking as described above, the information processing apparatus according to the present embodiment registers the character string of the receipt information whose record does not exist in the database against the JAN code indicated by the barcode information corresponding to the estimated article in the database in association with each other.

For example, the purchased article indicated by the receipt information is estimated by the processing illustrated in FIG. 2 being performed. Note that it goes without saying that the processing in the case where the estimation processing according to the present embodiment is performed is not limited to the example illustrated in FIG. 2.

Figure 3:
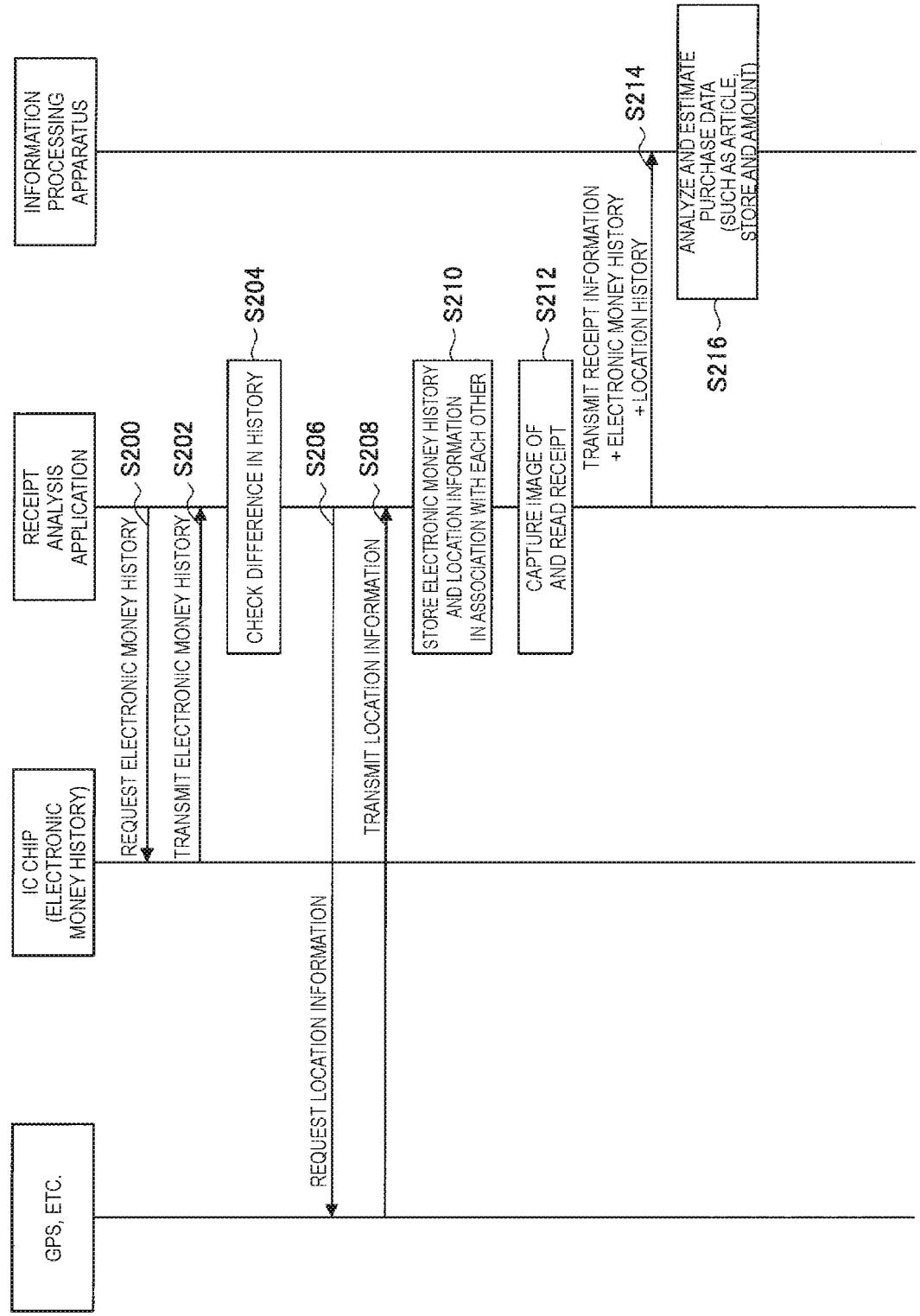
FIG. 3 is an explanatory diagram illustrating a second example of the processing relating to the information processing method according to the present embodiment.

[2-2] Second Example of Processing Relating to Information Processing Method According to Present Embodiment FIG. 3 is an explanatory diagram illustrating a second example of the processing relating to the information processing method according to the present embodiment and illustrates an example of the processing in the case where the estimation processing and the confirmation processing according to the present embodiment are performed.

The receipt analysis application executed at the application side apparatus transmits an electronic money history request including a command for transmitting electronic money history, to an IC chip provided at the application side apparatus (S200). The IC chip transmits the electronic money history to the receipt analysis application in response to the electronic money history request (S202).

The receipt analysis application determines whether there is a difference between the electronic money history acquired in step S202 and the previously acquired electronic money history (S204).

In the case where it is not determined that there is a difference in step S204, the receipt analysis application repeats processing from step S200. The receipt analysis application, for example, repeats the processing of step S200 at a set arbitrary timing such as at regular intervals.

Further, in the case where it is determined that there is a difference in step S204, the receipt analysis application transmits a request including a command for transmitting location information, to a GPS device, or the like (S206). The GPS device, or the like, which acquires the request transmitted in step S206 transmits the location information which is information of a location recorded when settlement is performed, to the receipt analysis application (S208).

The receipt analysis application which acquires the location information in step S208 holds the electronic money history and the location information in a recording medium in association with each other (S210).

Further, the receipt analysis application generates receipt information by reading the first captured image which is obtained by capturing an image of the receipt in a similar manner to step S100 in FIG. 2 (S212).

The receipt analysis application then transmits the receipt information, and the electronic money history and the location information held in association with each other to the information processing apparatus according to the present embodiment (S214).

The information processing apparatus according to the present embodiment which acquires the receipt information, the electronic money history (example of the information relating to settlement history) and the location information transmitted in step S214 estimates the purchased article indicated by the receipt information, a store where the article is purchased, an amount, or the like, by analyzing data relating to purchase by performing the above-described estimation processing and the above-described processing of (1) (confirmation processing) on the basis of the receipt information, the electronic money history and the location information (S216). Here, the information processing apparatus according to the present embodiment can discern, for example, fraudulent receipt information such as receipt information indicating content of a falsified receipt and receipt information indicating content of receipts of others by performing the above-described processing of (1) (confirmation processing) by utilizing the electronic money history and the location information.

For example, by the processing illustrated in FIG. 3 being performed, it is possible to prevent fraudulence by making use of characteristics of electronic money settlement in the IC chip provided at the application side apparatus. Note that it goes without saying that the processing in the case where the estimation processing and the confirmation processing according to the present embodiment are performed are not limited to the example illustrated in FIG. 3.

Figure 4A:
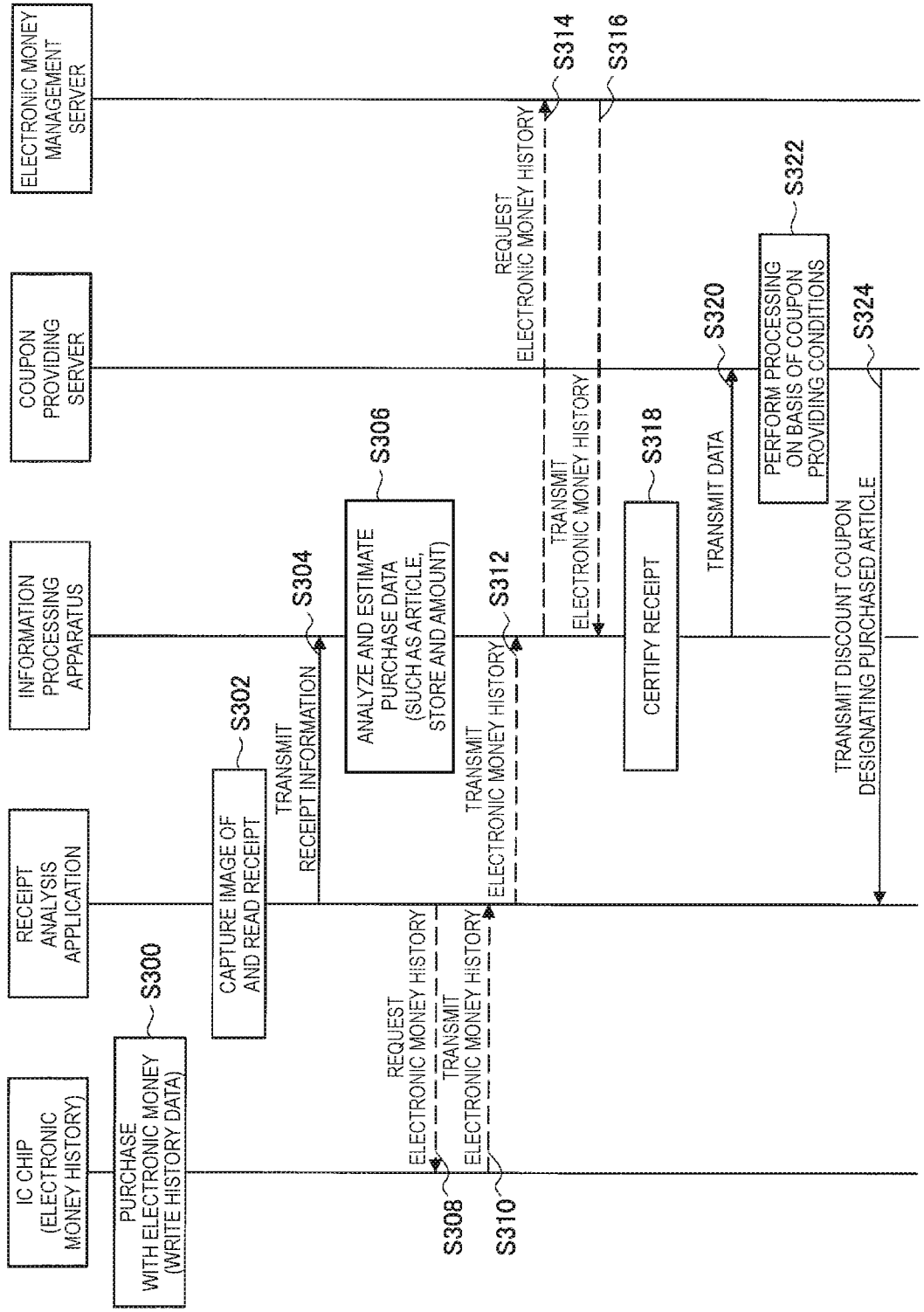
FIG. 4A is an explanatory diagram illustrating a third example of the processing relating to the information processing method according to the present embodiment.

[2-3] Third Example of Processing Relating to Information Processing Method According to Present Embodiment FIG. 4A and FIG. 4B are explanatory diagrams illustrating a third example of the processing relating to the information processing method according to the present embodiment and illustrate an example of the processing in the case where the estimation processing, the confirmation processing and the execution processing according to the present embodiment are performed.

Here, the processing from step S302 to S306 in FIG. 4A corresponds to an example of the processing in the case where the estimation processing according to the present embodiment is performed. Further, the processing from step S308 to S318 in FIG. 4A corresponds to an example of the processing in the case where the confirmation processing according to the present embodiment is performed. Further, the processing from step S320 to S324 in FIG. 4A and the processing from S328 to S344 in FIG. 4B correspond to an example of the processing in the case where the execution processing according to the present embodiment is performed. FIG. 4A and FIG. 4B illustrate examples where the execution processing according to the present embodiment is realized with a system having three apparatuses of the information processing apparatus according to the present embodiment, the coupon delivery server and the cashback server.

When an article, or the like, is purchased with electronic money, the IC chip provided at the application side apparatus records electronic money history in accordance with the settlement (S300).

The receipt analysis application of the application side apparatus generates receipt information by reading the first captured image which is obtained by capturing an image of the receipt in a similar manner to step S100 in FIG. 2 (S302).

The receipt analysis application then transmits the receipt information, and the electronic money history and the location information held in association with each other to the information processing apparatus according to the present embodiment (S304).

The information processing apparatus which acquires the receipt information transmitted in step S304 estimates the purchased article indicated by the receipt information, a store where the article is purchased, an amount, or the like, by analyzing data relating to purchase by performing the above-described estimation processing on the basis of the receipt information (S306).

The receipt analysis application executed at the application side apparatus transmits an electronic money history request including a command for transmitting the electronic money history, to the IC chip (S308). The IC chip transmits the electronic money history to the receipt analysis application in response to the electronic money history request (S310).

The receipt analysis application determines whether there is a difference between the electronic money history acquired in step S310 and the previously acquired electronic money history, and, in the case where it is determined that there is a difference, the receipt analysis application transmits the electronic money history (example of the information relating to settlement history) to the information processing apparatus according to the present embodiment (S312).

The information processing apparatus according to the present embodiment which acquires the electronic money history transmitted in step S312 transmits the electronic money history request including a command for transmitting the electronic money history corresponding to the acquired electronic money history, to an electronic money management server which manages electronic money (S314).

The electronic money management server transmits the electronic money history (example of the information relating to settlement history) to the information processing apparatus according to the present embodiment in response to the electronic money history request (S316).

The information processing apparatus according to the present embodiment which acquires the electronic money history transmitted in step S316 confirms content of the receipt indicated by the receipt information by performing the above-described processing of (1) (confirmation processing) on the basis of the receipt information, the electronic money history acquired in step S312 and the electronic money history acquired in step S316 (S318).

When the content of the receipt is confirmed in step S318, and the receipt is certified, the information processing apparatus according to the present embodiment, for example, transmits data such as a JAN code (example of the estimation result of the purchased article) obtained through the processing of step S306 to a coupon providing server which performs processing relating to provision of a coupon (S320).

The coupon providing server which acquires the data transmitted in step S320, for example, performs processing on the basis of the acquired data and set coupon delivery conditions (S322). The coupon providing server then, for example, transmits a coupon corresponding to the purchased article to the application side apparatus (in FIG. 4A, indicated as the receipt analysis application of the application side apparatus for convenience) (S324).

Further, the coupon providing server confirms whether conditions necessary for cashback, such as a purchase result of a coupon target article are satisfied (S326). If it is determined in step S326 that the conditions are satisfied, the coupon providing server transmits the cashback conditions (example of the setting information indicating cashback setting conditions) to the cashback serer which performs processing relating to cashback (S328).

The cashback server which acquires the cashback conditions transmitted in step S328 transmits the cashback information indicating a candidate destination for a cashback destination to the application side apparatus (in FIG. 4B, indicated as the receipt analysis application of the application side apparatus for convenience) (S330).

The receipt analysis application of the application side apparatus sets the cashback destination candidate on the basis of, for example, user operation (S332). A case where cashback to electronic money stored in the IC chip of the application side apparatus is set as the cashback destination candidate will be described below as an example.

The receipt analysis application requests reading of the cashback destination candidate, or the like, to the IC chip (S334), and the IC chip transmits service, an ID, or the like, to the receipt analysis application in response to the request (S336).

The receipt analysis application which acquires the service, the ID, or the like, transmitted in step S336 transmits information indicating the cashback destination to the cashback server as a response to the cashback information transmitted in step S330 (S338).

The cashback server which acquires the information indicating the cashback destination transmitted in step S338 performs processing relating to cashback (S340). A case where cashback of electronic money is directly given to the IC chip will be described below as an example.

The cashback server transmits a write request for directly giving cashback of electronic money to the IC chip to the application side apparatus (in FIG. 4B, indicated as the receipt analysis application of the application side apparatus for convenience) (S342). Here, the write request includes, for example, a write command and a value amount.

The receipt analysis application which acquires the write request transmitted in step S342 writes the value amount in the IC chip on the basis of the write request (S344).

For example, by the processing illustrated in FIG. 4A and FIG. 4B being performed, cashback based on the receipt information corresponding to the receipt in accordance with purchase is realized. Note that it goes without saying that the processing in the case where the estimation processing, the confirmation processing and the execution processing according to the present embodiment are not limited to the examples illustrated in FIG. 4A and FIG. 4B.

(Information Processing Apparatus According to Present Embodiment)

An example of a configuration of the information processing apparatus according to the present embodiment which can perform the above-described processing relating to the information processing method according to the present embodiment will be described below. An example of the configuration of the information processing apparatus according to the present embodiment which can perform the above-described estimation processing, the above-described processing of (1) (confirmation processing) and the above-described processing of (2) (execution processing) as the processing relating to the information processing method according to the present embodiment will be described below.

Figure 5:
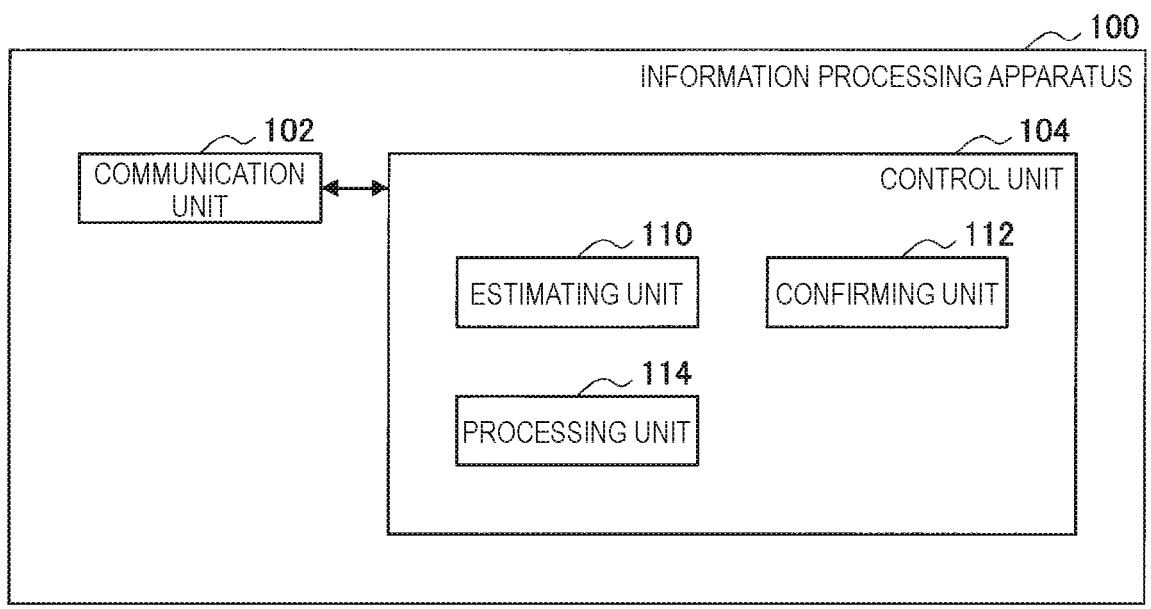
FIG. 5 is a block diagram illustrating an example of a configuration of an information processing apparatus according to the present embodiment.

FIG. 5 is a block diagram illustrating an example of the configuration of the information processing apparatus 100 according to the present embodiment. The information processing apparatus 100 includes, for example, a communication unit 102 and a control unit 104.

Further, the information processing apparatus 100 may include, for example, a read only memory (ROM, which is not illustrated), a random access memory (RAM, which is not illustrated), a storage unit (which is not illustrated), an operation unit (which is not illustrated) which can be operated by the user, a display unit (which is not illustrated) which displays various screens on a display screen, or the like. The information processing apparatus 100, for example, connects the above-described components with a bus which is a data transmission path.

The ROM (which is not illustrated) stores data for control such as a program and an operation parameter to be used by the control unit 104. The RAM (which is not illustrated) temporarily stores a program to be executed by the control unit 104.

The storage unit (which is not illustrated) which is a storage means provided at the information processing apparatus 100, for example, stores various kinds of data such as data relating to the information processing method according to the present embodiment such as reference information, and various kinds of application. Here, examples of the storage unit (which is not illustrated) can include, for example, a magnetic recording medium such as a hard disk, a nonvolatile memory such as a flash memory, or the like. Further, the storage unit (which is not illustrated) may be detachable from the information processing apparatus 100.

Examples of the operation unit (which is not illustrated) can include an operation input device which will be described later. Further, examples of the display unit (which is not illustrated) can include a display device which will be described later.

[Hardware Configuration Example of Information Processing Apparatus 100]

Figure 6:
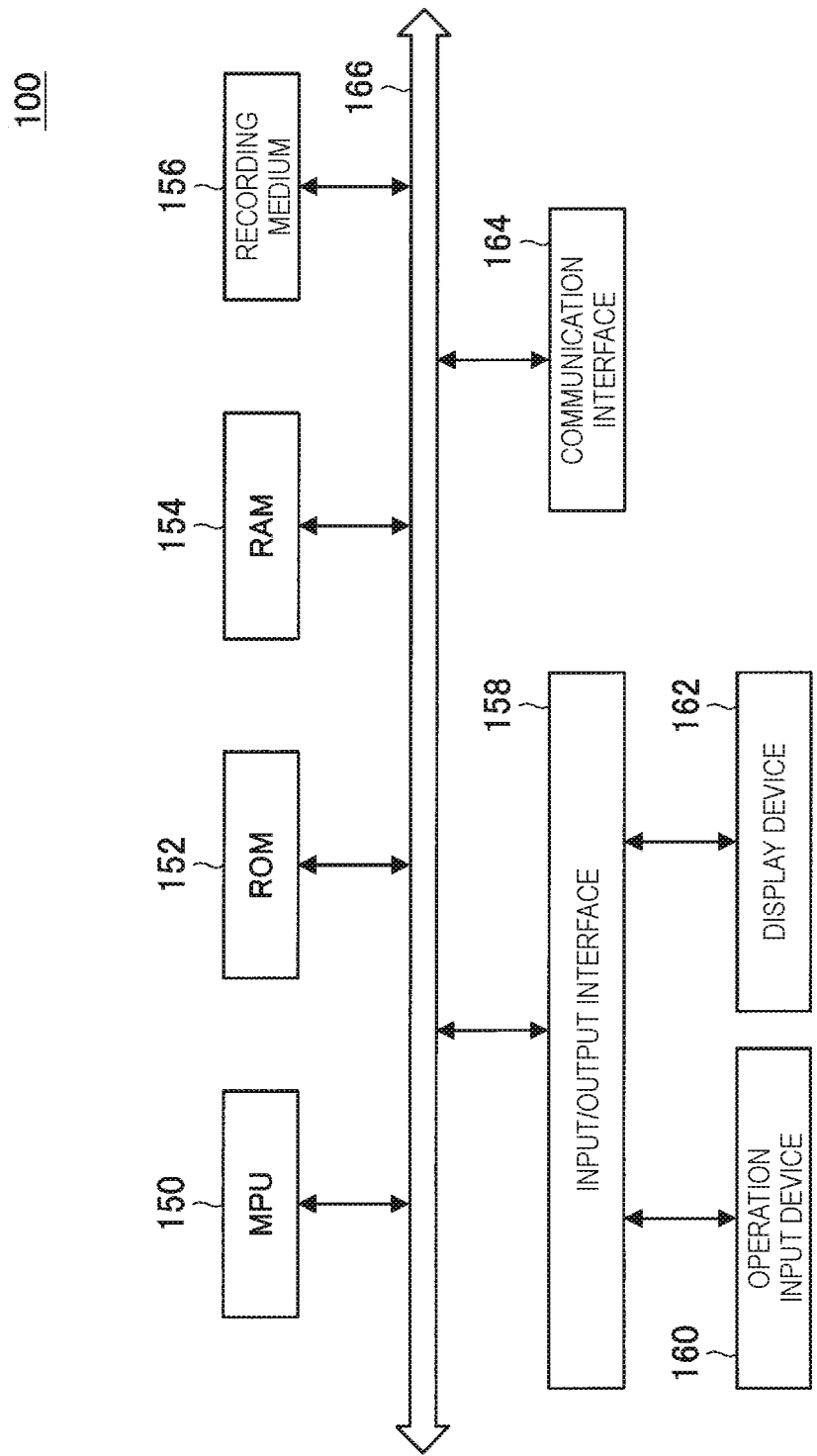
FIG. 6 is an explanatory diagram illustrating an example of a hardware configuration of the information processing apparatus according to the present embodiment.

FIG. 6 is an explanatory diagram illustrating an example of a hardware configuration of the information processing apparatus 100 according to the present embodiment. The information processing apparatus 100 includes, for example, an MPU 150, a ROM 152, a RAM 154, a recording medium 156, an input/output interface 158, an operation input device 160, a display device 162 and a communication interface 164. Further, the information processing apparatus 100, for example, connects the components with a bus 166 which is a data transmission path.

The MPU 150, for example, functions as one or more processors configured with an arithmetic circuit such as an MPU or a control unit 104 which is configured with various kinds of processing circuits, or the like, and which controls the whole of the information processing apparatus 100. Further, the MPU 150 plays a role of, for example, an estimating unit 110, which will be described later, a confirming unit 112, and a processing unit 114 at the information processing apparatus 100. Note that one or more of the estimating unit 110, the confirming unit 112 and the processing unit 114 may be configured with a dedicated (or general-purpose) circuit (such as, for example, a processor different from the MPU 150) which can realize processing of each unit.

The ROM 152 stores data for control such as a program and an operation parameter to be used by the MPU 150. The RAM 154, for example, temporarily stores a program, or the like, to be executed by the MPU 150.

The recording medium 156, which functions as a storage unit (which is not illustrated), stores various data such as data relating to the information processing method according to the present embodiment such as reference information and various kinds of application. Here, examples of the recording medium 156 can include, for example, a magnetic recording medium such as a hard disk and a nonvolatile memory such as a flash memory. Further, the recording medium 156 may be detachable from the information processing apparatus 100.

The input/output interface 158, for example, connects the operation input device 160 and the display device 162. The operation input device 160 functions as an operation unit (which is not illustrated), and the display device 162 functions as a display unit (which is not illustrated). Here, examples of the input/output interface 158 can include, for example, a universal serial bus (USB) terminal, a digital visual interface (DVI) terminal, a high-definition multimedia interface (HDMI) (registered trademark) terminal, various kinds of processing circuits, or the like.

Further, the operation input device 160 is, for example, provided on the information processing apparatus 100, and is connected to the input/output interface 158 inside the information processing apparatus 100. Examples of the operation input device 160 can include, for example, a button, a direction key, a rotary selector such as a jog dial, combination thereof, or the like.

Further, the display device 162 is, for example, provided on the information processing apparatus 100, and is connected to the input/output interface 158 inside the information processing apparatus 100. Examples of the display device 162 can include, for example, a liquid crystal display, an organic electro-luminescence (EL) display (also referred to as an organic light emitting diode (OLED) display), or the like.

Note that it goes without saying that the input/output interface 158 can be connected to an external device such as an operation input device (such as, for example, a keyboard and a mouse) outside the information processing apparatus 100 and an external display device. Further, the display device 162 may be a device which can realize display and user operation, such as, for example, a touch panel.

The communication interface 164, which is a communication means provided at the information processing apparatus 100, functions as a communication unit 102 for performing communication in a wireless or wired manner with the application side apparatus such as a smartphone and an external apparatus such as a server via a network (or directly). Here, examples of the communication interface 164 can include, for example, a communication antenna and a radio frequency (RF) circuit (wireless communication), a IEEE 802.15.1 port and a transmission/reception circuit (wireless communication), an IEEE 802.11 port and a transmission/reception circuit (wireless communication), a local area network (LAN) terminal and a transmission/reception circuit (wired communication), or the like.

The information processing apparatus 100 performs the processing relating to the information processing method according to the present embodiment with the configuration illustrated in, for example, FIG. 6. Note that the hardware configuration of the information processing apparatus 100 according to the present embodiment is not limited to the configuration illustrated in FIG. 6.

For example, in the case where the information processing apparatus 100 performs communication with an external apparatus via a connected external communication device, the information processing apparatus 100 does not have to include the communication interface 164. Further, the communication interface 164 may employ a configuration which enables communication with one or more external apparatuses using a plurality of communication schemes.

Further, the information processing apparatus 100 can employ a configuration which does not include, for example, the recording medium 156, the operation input device 160 and the display device 162.

Further, for example, the configuration illustrated in FIG. 6 (or configuration according to the modified example) may be implemented with one or more ICs.

Referring to FIG. 5 again, an example of the configuration of the information processing apparatus 100 will be described. The communication unit 102, which is a communication means provided at the information processing apparatus 100, performs communication with the application side apparatus such as a smartphone and an external apparatus such as a server in a wireless or wired manner via a network (or directly). Further, communication by the communication unit 102 is, for example, controlled by the control unit 104.

Here, while examples of the communication unit 102 can include, for example, a communication antenna and an RF circuit, a LAN terminal and a transmission/reception circuit, or the like, the configuration of the communication unit 102 is not limited to the above-described examples. For example, the communication unit 102 can employ a configuration complying with arbitrary standards which enables communication using a USB terminal and a transmission/reception circuit or can employ an arbitrary configuration which enables communication with an external apparatus via a network. Further, the communication unit 102 may employ a configuration which enables communication with one or more external apparatuses using a plurality of communication schemes.

The control unit 104, which is configured with, for example, an MPU, or the like, plays a role of controlling the whole of the information processing apparatus 100. Further, the control unit 104, which includes, for example, the estimating unit 110, the confirming unit 112 and the processing unit 114, plays a leading role of performing the processing relating to the information processing method according to the present embodiment.

The estimating unit 110, which plays a leading role of performing the above-described estimation processing, estimates the purchased article indicated by the receipt information on the basis of the receipt information and the code information. The estimating unit 110, for example, performs estimation processing according to a first example indicated in the above-described (1) to estimation processing according to a fourth example indicated in the above-described (d).

The confirming unit 112, which plays a leading role of performing the above-described processing of (1) (confirmation processing), for example, confirms content of the receipt indicated by the receipt information on the basis of the information relating to settlement history, the information relating to the settlement history and the location information, or the like.

The processing unit 114, which plays a leading role of performing the above-described processing of (2) (execution processing), performs processing in accordance with the estimation result of the purchased article. Examples of the processing in accordance with the estimation result performed by the processing unit 114 can include, for example, processing relating to cashback in accordance with the estimated article, delivery processing of delivering coupon information or recommend information associated with the estimated article, or the like.

Because the control unit 104 includes, for example, the estimating unit 110, the confirming unit 112 and the processing unit 114, the control unit 104 plays a leading role of performing the processing relating to the information processing method according to the present embodiment (the above-described estimation processing, the above-described processing of (1) (confirmation processing), and the above-described processing of (2) (execution processing)).

The information processing apparatus 100 performs the processing relating to the information processing method according to the present embodiment (for example, the above-described estimation processing, the above-described processing of (1) (confirmation processing) and the above-described processing of (2) (execution processing)) with the configuration illustrated in, for example, FIG. 5.

Therefore, with the configuration illustrated in, for example, FIG. 5, the information processing apparatus 100 can estimate the purchased article on the basis of the receipt information indicating a result of reading characters from a captured image which is obtained by capturing an image of the receipt.

Further, with the configuration illustrated in, for example, FIG. 5, the information processing apparatus 100 can provide an effect provided by the above-described processing relating to the information processing method according to the present embodiment being performed.

Note that the configuration of the information processing apparatus according to the present embodiment is not limited to the configuration illustrated in FIG. 5.

For example, the information processing apparatus according to the present embodiment can include one or more of the estimating unit 110, the confirming unit 112 and the processing unit 114 illustrated in FIG. 5, separately from the control unit 104 (for example, implement with other processing circuits).

Further, the information processing apparatus according to the present embodiment may employ a configuration which does not include one or both of the confirming unit 112 and the processing unit 114 illustrated in FIG. 5. Because the information processing apparatus according to the present embodiment can perform the above-described estimation processing even if the information processing apparatus does not include one or both of the confirming unit 112 and the processing unit 114 illustrated in FIG. 5, it is possible to estimate the purchased article on the basis of the receipt information indicating a result of reading characters from a captured image which is obtained by capturing an image of the receipt.

Further, the information processing apparatus according to the present embodiment may, for example, further include an electronic settlement processing unit (which is not illustrated) which plays a leading role of performing the above-described processing of (3) (electronic settlement processing). The electronic settlement processing unit (which is not illustrated) is implemented with, for example, a processor constituting the control unit 104 or other processing circuits different from the control unit 104 (such as, for example, other processors).

Further, as described above, the processing relating to the information processing method according to the present embodiment is divided into "the above-described estimation processing", "the above-described estimation processing and the above-described processing of (1) (confirmation processing)", "the above-described estimation processing and the above-described processing of (2) (execution processing)", "the above-described estimation processing, the above-described processing of (1) (confirmation processing) and the above-described processing of (2) (execution processing)", or the like, for convenience. Therefore, the configuration for realizing the processing relating to the information processing method according to the present embodiment is not limited to the estimating unit 110, the confirming unit 112 and the processing unit 114 illustrated in FIG. 5, and can be a configuration in accordance with a way of dividing the processing relating to the information processing method according to the present embodiment.

Further, for example, in the case where communication is performed with an external apparatus via an external communication device having similar functions and configuration to those of the communication unit 102, the information processing apparatus according to the present embodiment does not have to include the communication unit 102.

While the information processing apparatus has been described above as the present embodiment, the present embodiment is not limited to this form. The present embodiment ca be applied to various equipment such as, for example, a personal computer (PC) and a computer such as a server which can perform the processing relating to the information processing method according to the present embodiment. Further, the present embodiment can be also applied to, for example, a processing IC which can be incorporated into the equipment as described above.

Further, the information processing apparatus according to the present embodiment can be also applied to a system such as, for example, cloud computing, which is configured with one or more apparatuses assuming connection to a network (or communication among apparatuses). That is, the above-described information processing apparatus according to the present embodiment can be, for example, implemented as an information processing system which performs the processing relating the information processing method according to the present embodiment (for example, "the above-described estimation processing", "the above-described estimation processing and the above-described processing of (1) (confirmation processing)", "the above-described estimation processing and the above-described processing of (2) (execution processing)", "the above-described estimation processing, the above-described processing of (1) (confirmation processing) and the above-described processing of (2) (execution processing)") with a plurality of apparatuses.

(Program According to Present Embodiment)

By a program for causing a computer to function as the information processing apparatus according to the present embodiment (for example, a program which can implement the processing relating to the information processing method according to the present embodiment, such as "the above-described estimation processing", "the above-described estimation processing and the above-described processing of (1) (confirmation processing)", "the above-described estimation processing and the above-described processing of (2) (execution processing)", and "the above-described estimation processing, the above-described processing of (1) (confirmation processing) and the above-described processing of (2) (execution processing)") being executed by a processor, or the like, at a computer, it is possible to estimate the purchased article on the basis of the receipt information indicating a result of reading characters from a captured image which is obtained by capturing an image of the receipt.

Moreover, when a program that causes a computer to function as the information processing apparatus according to the present embodiment is executed by a processor or the like in the computer, it is possible to provide an effect provided by the processing related to the information processing method according to the present embodiment described above.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an estimating unit configured to estimate a purchased article indicated by receipt information on the basis of the receipt information indicating a result of reading characters from a first captured image which is obtained by capturing an image of a receipt, and code information indicating a result of detecting a one-dimensional code or a two-dimensional code from a second captured image which is obtained by capturing an image of a one-dimensional code or a two-dimensional code of an article.

(2)

The information processing apparatus according to (1), in which the estimating unit estimates the purchased article by checking a character string indicated by the receipt information against a character string corresponding to an article specified from the result of detecting the one-dimensional code or the two-dimensional code indicated by the code information.

(3)

The information processing apparatus according to (2), in which, in the case where, as a result of checking, a plurality of character strings corresponding to the specified article match the character string indicated by the receipt information, the estimating unit estimates the purchased article on the basis of a number indicating price corresponding to the character string indicated by the receipt information, and information relating to sale corresponding to the specified article, the number and the information relating to sale being indicated by the receipt information.

(4)

The information processing apparatus according to (2) or (3), in which the estimating unit estimates a retailer who sells the article on the basis of the receipt information and further estimates the purchased article on the basis of information relating to sale corresponding to the estimated retailer.

(5)

The information processing apparatus according to any one of (1) to (4), in which, in the case where the purchased article is estimated, the estimating unit records a character string indicated by the receipt information from which the article is estimated and the code information in association with each other.

(6)

The information processing apparatus according to (5), in which, in the case where the character string indicated by the receipt information from which the article is estimated and the code information are recorded in association with each other, the estimating unit estimates the purchased article indicated by the receipt information on the basis of the character string indicated by the receipt information, and a character string corresponding to the article specified from the result of detecting the one-dimensional code or the two-dimensional code indicated by the code information, or reference information in which the character string indicated by the receipt information from which the article is estimated is associated with the code information.

(7)

The information processing apparatus according to any one of (1) to (6), further including:

a confirming unit configured to confirm a content of the receipt indicated by the receipt information on the basis of information relating to settlement history.

(8)

The information processing apparatus according to (7), in which the confirming unit confirms a content of the receipt indicated by the receipt information on the basis of location information indicating a location where settlement is performed.

(9)

The information processing apparatus according to (7) or (8), in which the confirming unit confirms whether the result of reading characters from the first captured image is correct as confirmation of the content of the receipt.

(10)

The information processing apparatus according to any one of (7) to (9), in which the confirming unit confirms whether a person who purchases an article relating to the receipt corresponding to the receipt information and a person who applies execution of processing at the information processing apparatus are the same person as confirmation of the content of the receipt.

(11)

The information processing apparatus according to any one of (7) to (10), in which the confirming unit confirms whether the purchased article has already been estimated on the basis of the receipt information as confirmation of the content of the receipt.

(12)

The information processing apparatus according to any one of (1) to (11), in which the estimating unit estimates the purchased article on the basis of the receipt information based on the acquired first captured image or the acquired receipt information.

(13)

The information processing apparatus according to (12), in which, in the case where the first captured image is acquired, the estimating unit generates the receipt information by reading characters from the acquired first captured image, and the estimating unit estimates the purchased article on the basis of the generated receipt information.

(14)

The information processing apparatus according to any one of (1) to (13), in which the estimating unit estimates the purchased article on the basis of the code information based on the acquired second captured image or the acquired code information.

(15)

The information processing apparatus according to (14), in which, in the case where the second captured image is acquired, the estimating unit generates the code information by detecting a one-dimensional code or a two-dimensional code from the acquired second captured image, and the estimating unit estimates the purchased article on the basis of the generated code information.

(16)

The information processing apparatus according to any one of (1) to (15), further including:

a processing unit configured to perform processing in accordance with an estimation result of a purchased article, in which the processing unit specifies a user to whom a result of the processing in accordance with the estimation result is to be provided on the basis of identification information indicating a person who applies execution of processing at the information processing apparatus, and the processing unit provides the result of the processing in accordance with the estimation result to the specified user.

(17)

The information processing apparatus according to any one of (1) to (16), further including:

a processing unit configured to perform processing in accordance with an estimation result of a purchased article, in which the processing unit specifies a user to whom a result of the processing in accordance with the estimation result is to be provided on the basis of information relating to settlement history corresponding to a content of the receipt indicated by the receipt information, and the processing unit provides the result of the processing in accordance with the estimation result to the specified user.

(18)

The information processing apparatus according to (17), further including:

an electronic settlement processing unit configured to perform settlement using electronic money, in which the information relating to settlement history is information relating to settlement performed by the electronic settlement processing unit.

(19)

An information processing method executed by an information processing apparatus, the information processing method including:

a step of estimating a purchased article indicated by receipt information on the basis of the receipt information indicating a result of reading characters from a first captured image which is obtained by capturing an image of a receipt, and code information indicating a result of detecting a one-dimensional code or a two-dimensional code from a second captured image which is obtained by capturing an image of a one-dimensional code or a two-dimensional code of an article.

(20)

An information processing system including a plurality of apparatuses, and estimating a purchased article indicated by receipt information on the basis of the receipt information indicating a result of reading characters from a first captured image which is obtained by capturing an image of a receipt, and code information indicating a result of detecting a one-dimensional code or a two-dimensional code from a second captured image which is obtained by capturing an image of a one-dimensional code or a two-dimensional code of an article.

REFERENCE SIGNS LIST

100 information processing apparatus
102 communication unit
104 control unit
110 estimating unit
112 confirming unit
114 processing unit

The invention claimed is:

1. An information processing apparatus, comprising:
an estimating unit configured to:
generate receipt information based on an optical character recognition (OCR) operation on a first captured image of a receipt of a purchased article;
determine that one or more character strings in the receipt information are absent from a database that comprises information associated with a plurality of articles;
detect one of a one-dimensional code or a two-dimensional code of the purchased article from a second captured image, wherein the one of the one-dimensional code or the two-dimensional code is detected based on the determination that the one or more character strings are absent from the database; and
estimate the purchased article based on:
the receipt information, and
code information that indicates a result of the detection of the one of the one-dimensional code of the two-dimensional code of the purchased article.

2. The information processing apparatus according to claim 1,
wherein the estimating unit is further configured to estimate the purchased article based on a comparison of a first character string indicated by the receipt information with a second character string corresponding to the purchased article indicated by the code information.

3. The information processing apparatus according to claim 2, wherein, in a case where a plurality of character strings corresponding to the purchased article match the first character string indicated by the receipt information, the estimating unit is configured to estimate the purchased article based on:
a number indicating a price corresponding to the first character string indicated by the receipt information, and information relating to a sale corresponding to the purchased article, indicated by the receipt information.

4. The information processing apparatus according to claim 2, wherein the estimating unit is further configured to:
estimate a retailer of the purchased article based on the receipt information; and
estimate the purchased article based on information relating to a sale corresponding to the estimated retailer.

5. The information processing apparatus according to claim 1, wherein, in a case where the purchased article is estimated, the estimating unit is further configured to record:
a character string indicated by the receipt information from which the purchased article is estimated, and
the code information in association with the character string.

6. The information processing apparatus according to claim 5, wherein, in a case where the character string is recorded in association with the code information, the estimating unit is further configured to estimate the purchased article indicated by the receipt information based on:
the character string indicated by the receipt information, and
a character string corresponding to the purchased article, based on the detection, or reference information in which the character string indicated by the receipt information is associated with the code information.

7. The information processing apparatus according to claim 1, further comprising a confirming unit configured to confirm a content of the receipt indicated by the receipt information based on information related to settlement history.

8. The information processing apparatus according to claim 7, wherein the confirming unit is further configured to confirm the content of the receipt indicated by the receipt information based on location information indicating a location where settlement is performed.

9. The information processing apparatus according to claim 7, wherein the confirming unit is further configured to confirm that the receipt information generated from the OCR operation is correct as the confirmation of the content of the receipt.

10. The information processing apparatus according to claim 7, wherein the confirming unit is further configured to confirm that a purchaser of the purchased article relating to the receipt corresponding to the receipt information and a person associated with the information processing apparatus are the same person.

11. The information processing apparatus according to claim 7, wherein the confirming unit is further configured to confirm that the purchased article has already been estimated based on the receipt information.

12. The information processing apparatus according to claim 1, wherein the estimating unit is further configured to estimate the purchased article based on one of the first captured image or the receipt information.

13. The information processing apparatus according to claim 12, wherein the estimating unit is further configured to estimate the purchased article based on the generated receipt information.

14. The information processing apparatus according to claim 1, wherein the estimating unit is further configured to estimate the purchased article based on the code information from one of the second captured image or the code information.

15. The information processing apparatus according to claim 14, wherein the estimating unit is further configured to:
generate the code information by the detection of the one of the one-dimensional code or the two-dimensional code from the second captured image, and
estimate the purchased article based on the generated code information.

16. The information processing apparatus according to claim 1, further comprising:
a processing unit configured to:
process a transaction based on an estimation result of the purchased article;
specify a user based on identification information indicating a person associated with the information processing apparatus; and
provide the result of the processed transaction to the specified user based on the estimation result.

17. The information processing apparatus according to claim 1, further comprising:
a processing unit is further configured to:
process a transaction based on an estimation result of the purchased article;
specify a user based on the estimation result and information relating to settlement history corresponding to a content of the receipt indicated by the receipt information; and
provide a result of the processed transaction based on the estimation result to the specified user.

18. The information processing apparatus according to claim 17, further comprising an electronic settlement processing unit configured to perform settlement using electronic money, wherein the information relating to the settlement history is information relating to settlement performed by the electronic settlement processing unit.

19. An information processing method comprising:
in an information processing apparatus:
generating receipt information based on an optical character recognition (OCR) operation on a first captured image of a receipt of a purchased article;
determining that one or more character strings in the receipt information are absent from a database that comprises information associated with a plurality of articles;
detecting one of a one-dimensional code or a two-dimensional code of the purchased article from a second captured image, wherein the one of the one-dimensional code or the two-dimensional code is detected based on the determination that the one or more character strings are absent from the database; and
estimating the purchased article based on:
the receipt information, and
code information that indicates a result of the detection of the one of the one-dimensional code or the two-dimensional code of the purchased article.

20. An information processing system, comprising:
a plurality of apparatuses; and
a processor configured to:
generate receipt information based on an optical character recognition (OCR) operation on a first captured image of a receipt of a purchased article;
determine that one or more character strings in the receipt information are absent from a database that comprises information associated with a plurality of articles;
detect one of a one-dimensional code or a two-dimensional code of the purchased article from a second captured image, wherein the one of the one-dimensional code or the two-dimensional code is detected based on the determination that the one or more character strings are absent from the database; and estimate the purchased article based on:
the receipt information, and
code information that indicates a result of the detection of the one of the one-dimensional code or the two-dimensional code of the purchased article.

* * * * *